US008046917B2

(12) United States Patent
Kosiorek

(10) Patent No.: US 8,046,917 B2
(45) Date of Patent: Nov. 1, 2011

(54) METHOD OF REFURBISHING A DIESEL INJECTOR VALVE SEAT

(75) Inventor: Roman F. Kosiorek, Greenville, MI (US)

(73) Assignee: Detroit Diesel Remanufacturing LLC, Detroit, MI (US)

( * ) Notice: Subject to any disclaimer, the term of this patent is extended or adjusted under 35 U.S.C. 154(b) by 1014 days.

(21) Appl. No.: 11/943,802

(22) Filed: Nov. 21, 2007

(65) Prior Publication Data

US 2009/0126193 A1 May 21, 2009

(51) Int. Cl.

| | |
|---|---|
| ***B21D 53/84*** | (2006.01) |
| ***B21K 1/18*** | (2006.01) |
| ***B23P 6/00*** | (2006.01) |
| ***F16K 43/00*** | (2006.01) |

(52) U.S. Cl. ........... 29/890.121; 29/888.44; 29/890.143; 29/402.04; 29/402.06

(58) Field of Classification Search ............... 29/888.44, 29/890.126, 890.128, 890.143, 402.04–402.06; 137/15.17

See application file for complete search history.

(56) References Cited

U.S. PATENT DOCUMENTS

| | | | | |
|---|---|---|---|---|
| 4,703,142 | A | 10/1987 | Dzewaltowski et al. | |
| 4,733,502 | A | 3/1988 | Braun | |
| 5,281,057 | A | 1/1994 | Ritt | |
| 5,355,572 | A | 10/1994 | Kammeraad et al. | |
| 5,954,312 | A | 9/1999 | Earnhardt | |
| 6,035,532 | A | 3/2000 | Earnhardt | |
| 6,132,151 | A | 10/2000 | Courmier | |
| 6,339,877 | B1 | 1/2002 | Straub et al. | |
| 6,866,210 | B2 | 3/2005 | Hohl et al. | |
| 7,861,738 | B2 * | 1/2011 | Erbes | 137/15.08 |
| 2003/1016853 | | 9/2003 | Maier | |
| 2005/0028365 | A1 | 2/2005 | Dantes | |

* cited by examiner

*Primary Examiner* — David Bryant
*Assistant Examiner* — Alexander P Taousakis
(74) *Attorney, Agent, or Firm* — Bill C. Panagos; Rader, Fishman & Grauer PLLC

(57) ABSTRACT

A method to refurbish a valve seat in a fuel injector module housing where the valve seat is of a larger diameter than an associate valve guide bore user using an indexable insert insertable into the bore and oriented in a manner to engage the valve seat to facilitate refurbishing.

4 Claims, 3 Drawing Sheets

METHOD OF REFURBISHING A DIESEL INJECTOR VALVE SEAT

BACKGROUND OF THE INVENTION

1. Field of the Invention

The present invention relates to a method to refurbish a diesel injector valve seat wherein the valve seat is of greater diameter than the valve guide bore.

2. Description of the Related Art

Straub, et al., U.S. Pat. No. 6,339,877, is already known to Detroit Diesel Corporation. Basically, the patent discloses an apparatus and method of refurbishing a valve seat disposed at a predetermined angle relative to the centerline of an associated valve bore in a workpiece wherein the apparatus includes a support structure on which the workpiece is located such that the centerline of the valve bore is assigned with a known reference axis. The apparatus further includes a tool having a lapping portion corresponding to the valve seat and a drive mechanism for moving the tool along the known reference axis such that the lapping portion is brought into engagement with the valve seat and for rotating the tool relative to the workpiece to lap the valve seat. The method generally includes locating the workpiece in a predetermined position such that the centerline of the valve bore is aligned with the known reference axis and moving the tool having a lapping portion corresponding to the valve seat along the known reference axis such that the lapping portion is brought into engagement with the valve seat. The tool is rotated relative to the workpiece to the lap the valve seat, and the tool is then moved along the known reference axis to disengage the lapping portion from the valve seat.

Earnhardt, U.S. Pat. No. 6,035,532 discloses a method of manufacturing a conical valve seat wherein the valve seat surface is placed in alignment with a cutting edge of a pattern impression pin, a predetermined amount of pressure is applied to the valve seat to move the valve seat surface relative to the cutting edge of a pattern impression pin to form a groove in the seat, hardening the seat member and then grinding a conical surface in the seat surface to finish it.

Dantes, U.S. Patent Publication No, 2005/0028365 discloses a method for manufacturing a valve-seat member of a fuel injector having helical grooves in a recess to generate a swirl, a valve-seat surface of the valve-seat member cooperating with a valve-closure member of a fuel injector to form a sealing seat, and the recess being used to guide the valve-closure member. The method includes producing a blank of the valve-seat member, introducing the recess, and at least one spray-discharge orifice into the blank of the valve-seat member and introducing helical grooves into the recess. The introduction of helical grooves into the recess is carried out by a non-cutting machining step.

BRIEF SUMMARY OF THE INVENTION

A method for refurbishing a valve seat in a fuel injector module housing with a valve seat of larger diameter than an associated valve guide bore. The method comprises inserting an indexable lapping insert into said valve guide bore. The insert has inclined top and bottom surfaces coated with an abrasive to form lapping surface. The top and bottom surfaces are separated by a side wall extending substantially unbroken therebetween. The side wall is comprised of two opposed flats of equal length intersecting two opposed arcs of equal length such that the insert is insertable in said bore by orientating lapping the valve seat by rotational movement of the insert by the spindle. After lapping is completed, the insert is removed from valve guide bore.

The lapping surfaces may coated with a diamond or boron nitride grit, and the insert opening is a hex key to cooperatively engage hex key spindle to facilitate lapping.

An O ring is preferably provided on the spindle to limit longitudinal movement of said insert on said spindle and permit insert to fill float to follow existing valve seat geometry.

DETAILED DESCRIPTION OF THE PREFERRED EMBODIMENT(S)

Figure 1:
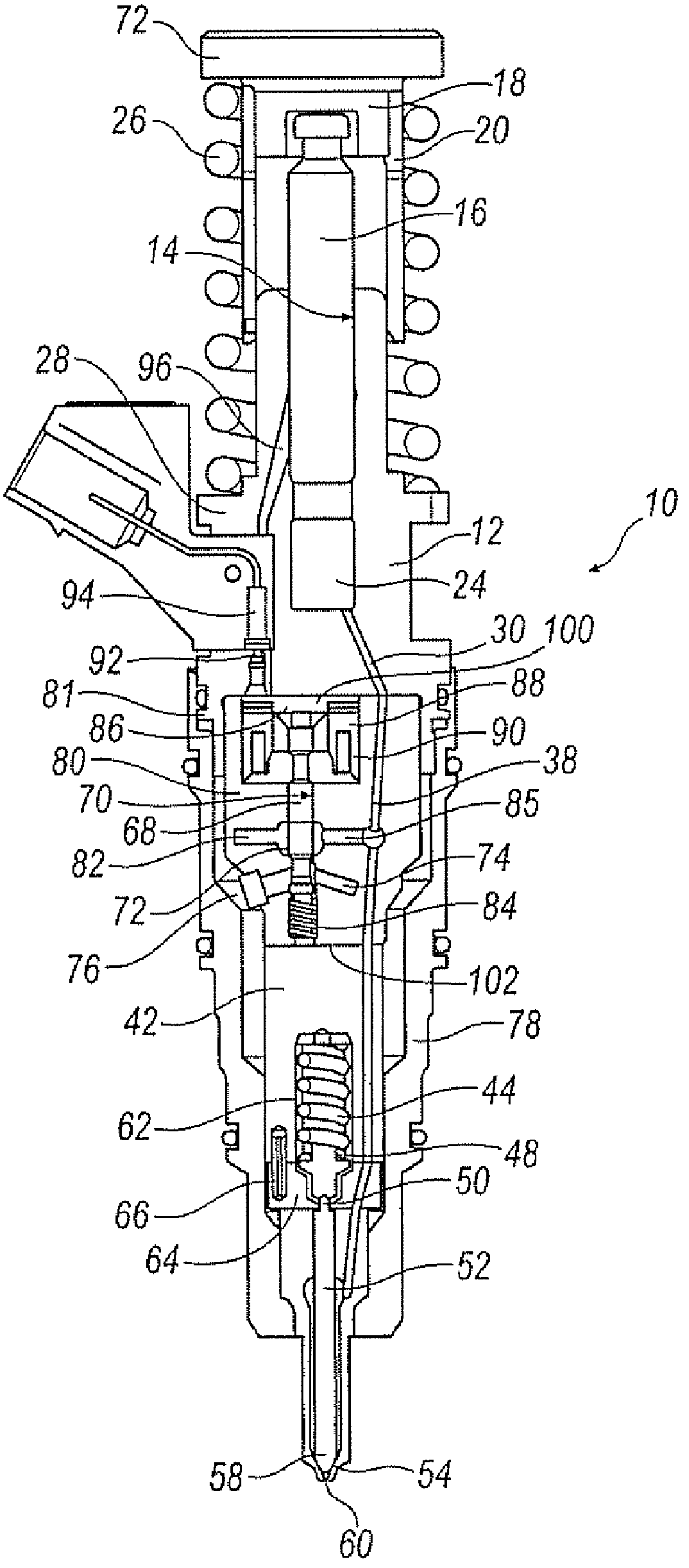
FIG. 1 is a cross-sectional view showing the overall assembly of an injector.

The present invention is a method to use an indexable insert to refurbish a valve seat in a fuel injector having a greater diameter than an associate valve guide bore.

The injector assembly 10 of the useful in the method of the present invention includes a relatively small pump body 12. A central pumping cylinder 14 in body 12 receives plunger 16. A cam follower assembly 18 includes a follower sleeve 20 and a spring seat 22. The follower assembly 20 is connected to the outer end of plunger 16. The cylinder 14 and plunger 16 define a high-pressure cavity 24. The plunger is urged normally to an outward position by plunger spring 26, which is seated on the spring seat 22 at the outer end of the plunger. The inner end of the spring is seated on a spring seat shoulder 28 of the pump body 12.

The cam follower 18 is engageable with a surface 30 of an actuator assembly shown at 32, which is driven by engine camshaft 34 in known fashion. Plunger 16 is driven at a stroke frequency directly related to engine speed, as previously explained in the known fashion. The stroking of the piston creates pumping pressure in high pressure cavity 24, which is distributed through an internal passage 36 formed in the lower end of the body 12. This passage communicates with the high-pressure passage 38 formed in the control valve module 40. The opposite end of the passage 38 communicates with high-pressure passage 38 in a spring cage 42 for needle valve spring 44.

When the actuator assembly 32 moves through an angle "a", there will be a tendency for a transverse load to develop on follower 18. To avoid that transverse load, follower 18 is provided with transverse freedom of movement relative to seat 22 as relative sliding movement at the engaging surfaces of the follower and the seat takes place. Transverse load also may be transmitted from seat 22 to sleeve 20, which is supported by body 12, reducing transverse load transmitted to plunger 16.

The dimensional tolerances of the plunger 16 and the cylinder 14 provide a fit that is much closer than the fit of sleeve 20 on the body 12. To accommodate the differences in the tolerances for plunger 16 and for the sleeve 20, provision is made for relative sliding movement at the engaging surfaces of the plunger 16 and the seat 22. Thus, there are four locations for compliant shifting movement of the elements of the plunger and actuator mechanism. The first is the spherical interface between the engine rocker arm 46 and the follower 18. The second location is the flat surface at the interface of follower 18 and seat 22. The third location is at the cylindrical surface interface of the sleeve 20 and the portion of body 12 over which the sleeve 20 fits. The fourth location is at the interface of the plunger 16 and the seat 22.

The spring 44 engages a spring seat 48, which is in contact with the end 50 of a needle valve 52 received in a nozzle element 54. The needle valve 52 has a large diameter portion and a smaller diameter portion, which define a differential area 56 in communication with high-pressure fluid in passage 38. The end of the needle valve 52 is tapered, and as shown at 58, the tapered end registering with a nozzle orifice 60 through which fuel is injected into the combustion chamber of the engine with which the injector is used.

When the plunger 16 is stroked, pressure is developed in passage 38, which acts on the differential area of the needle valve and retracts the needle valve against the opposing force of needle valve spring 44, thereby allowing high-pressure fluid to be injected through the nozzle orifice. Spring 44, located in the spring cage 62, is situated in engagement with the end of the pocket in the spring cage occupied by spring 44. A spacer 64, located at the lower end of the spring cage 62, positions the spring cage with respect to the nozzle element 100. A locator pin can be used, as shown in FIG. 1, to provide correct angular disposition of the spacer 64 with respect to the spring cage 62.

Figure 2:
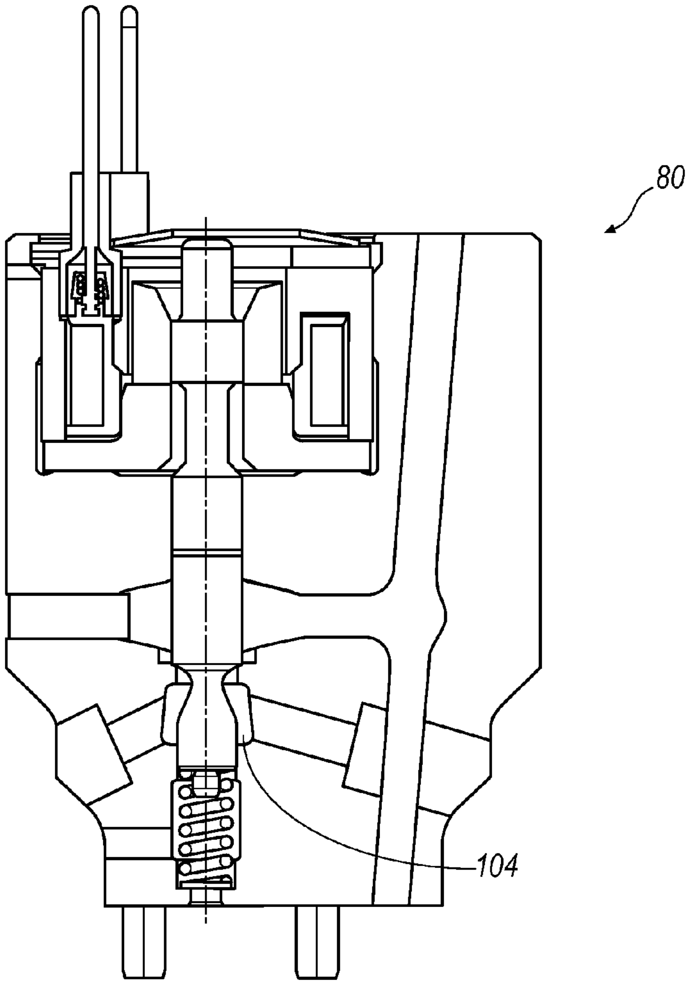
FIG. 2 is a cross-sectional detailed view of the module of the fuel injector of FIG. 1.

A control valve 68 is located in a cylindrical valve chamber 70. A high-pressure groove 72 surrounding the valve 68 is in communication with high-pressure passage 38. When the valve is positioned as shown in FIGS. 2 and 5, the valve 68 will block communication between high-pressure passage 38 and low-pressure passage or spill bore 74, which extends to low-pressure port 76 in the nozzle nut 78. The nozzle nut 78 extends over the module 80. It is threadably connected at 81 to the lower end of the cylinder body 12. The connection between passage 38 and groove 72 can be formed by a cross-passage drilled through the module 80. One end of the cross-passage is blocked by a pin or plug 82. The end of control valve 68 engages a control valve spring 84 located in module 80. This spring tends to open the valve and to establish communication between high-pressure passage 38 and low-pressure passage 24, thereby decreasing the pressure acting on the nozzle valve element. Central valve 68 carries an armature 86, which is drawn toward the stator 88 when the windings of the stator are energized, thereby shifting the valve 68 to a closed position and allowing the plunger 16 to develop a pressure pulse that actuates the nozzle valve element.

The stator assembly 88 is located in a cylindrical opening 90 in the module 80. The valve 68 extends through a central opening in the stator assembly. The windings of the stator assembly extend to an electrical terminal 92, which in turn is connected to an electrical connector assembly 94 secured to the pump body 12. This establishes an electrical connection between a wiring harness for an engine controller (not shown) and the stator windings.

A low-pressure passage 96 is formed in the cylinder body 12. This communicates with a low-pressure region 98 at the stator assembly and with a low-pressure region 100, which surrounds the module 80. Fluid that leaks past the plunger 16 during the pumping stroke is drained back through the low-pressure passage 96 to the low-pressure return port 76.

The interface of the upper end of the spring cage 62 and the lower end of the module 80 is shown at 102. The mating surfaces at the interface 102 are precisely machined to provide flatness that will establish high-pressure fluid communication between passage 39 and passage 38. The pressure in spring cage 42, however, is at the same pressure that exists in port 76. This is due to the balance pressure port 104, whereby the chamber for spring 24 communicates with the low-pressure region surrounding the module 80.

The upper surface of the module 80 and the lower surface of the pump body 12 are precisely machined to establish high-pressure fluid distribution from passage 36 to passage 38. The seal established by the mating precision machined surfaces at each end of the module 80 eliminates the need for providing fluid seals, such as O-rings.

The assembly of the pump body 12, the module 80, the spring cage 42 and the nozzle element 54 are held in stacked, assembled relationship as the nozzle nut 78 is tightened at the threaded connection 81. The module, the spring cage and the nozzle element can be disassembled readily merely by disengaging the threaded connection at 81, which facilitates servicing and replacement of the elements of the assembly. The injector thus described is as set forth in U.S. Pat. No. 6,565,020, incorporated by reference herein.

FIG. 2 is a detailed section of the module 80 of the injector assembly 10 of FIG. 1, showing the control valve in a cylindrical valve chamber with a valve seat 104. It will be appreciated that the valve seat is of larger diameter than the cylindrical valve chamber within which the valve stem of the valve reciprocates. When the valve seat becomes worn due to cavitation, it is desirable to re-grind the valve seat. However, due to the fact that the valve guide bore is of smaller diameter than the valve seat diameter, it has been a challenge in the art to re-grind such valve seats.

Figure 3:
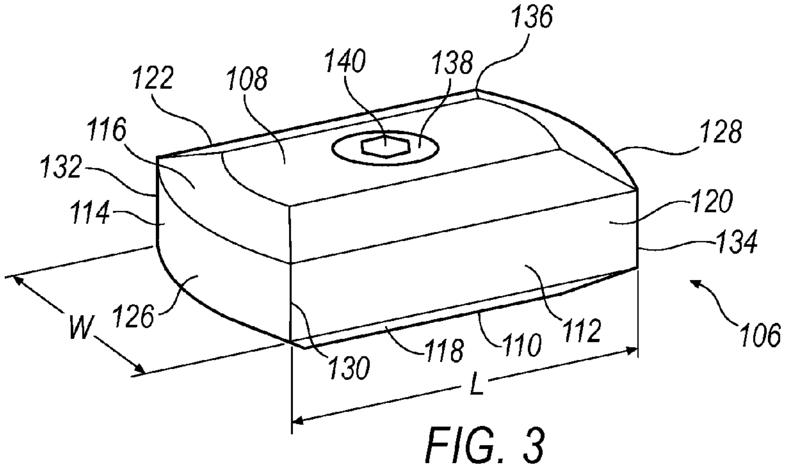
FIG. 3 is a perspective view of a lapping insert.

FIG. 3 is a perspective view of an indexable lapping insert 106. The insert has a top surface 108, and a bottom surface 110 separated by side wall 112 extending substantially unbroken therebetween and define a body 114 having a length L and a width W. Top and bottom surfaces are inclined outwardly from a center at an angle to define lapping surfaces 116 and 118, respectively. The lapping surfaces may be coated with an abrasive material such as a diamond grit, preferably a 30 mm diamond grit, or any other abrasive grit such as, for example, boron nitride, or any other grit. The side wall is comprised of two opposed flats 120 and 122, respectively, to define a width W that is slightly less than the diameter of the cylindrical valve chamber or valve guide bore into which the insert will be placed. The sidewall also has two opposed preferably equal arcs 126 and 128 respectively that intersect the flats at their ends 130, 132 and 134, 136, respectively to define a length, preferably as great as the diameter of the valve seat, so that there is sufficient overlap to machine the valve seat in a manner to be hereafter described.

The insert is further equipped with a centrally located keyed aperture, 140 preferably a hex key aperture, extending perpendicular through the top and bottom surfaces. The aperture may be relieved 138 along its opening 140 and 142, in top and bottom surfaces respectively, to facilitate insertion of a keyed spindle in a manner to be herein after described. Preferably, no grit or abrasive is deposited the area 138 around the openings of the aperture in order to facilitate location of the spindle into the aperture.

Figure 4C:
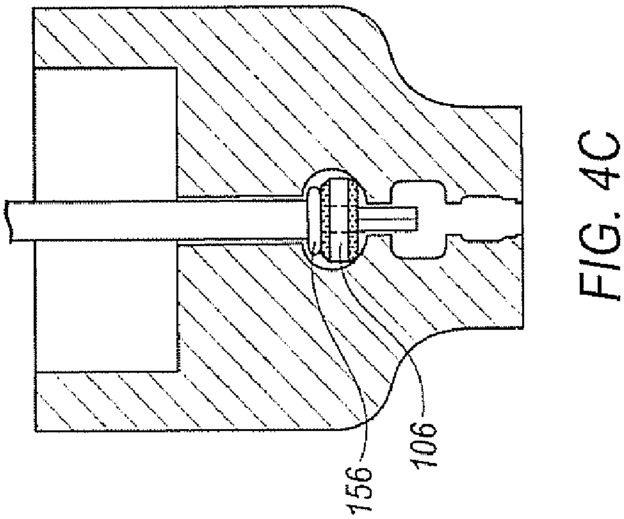
FIG. 4C is a schematic cross-sectional view of the module of FIG. 4B with the spindle inserted within the insert.
Figure 4B:
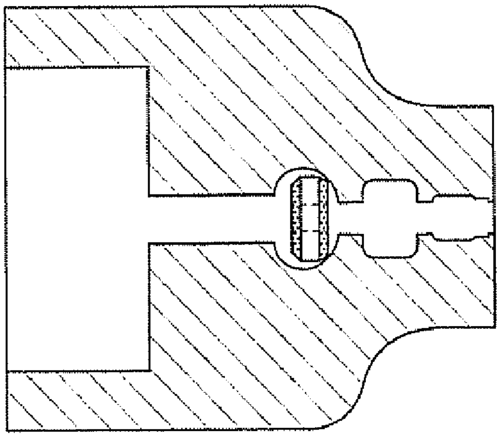
FIG. 4B is a schematic cross sectional view of the module of FIG. 4A, showing the insert seated against the valve seat.
Figure 4A:
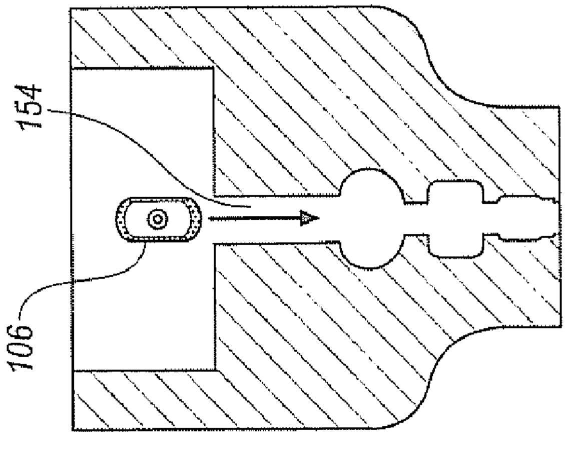
FIG. 4A is a schematic cross sectional view of the module of FIG. 2, showing insertion of the insert of FIG. 3.

FIG. 4A is a sectional schematic view of the module of FIG. 2 showing insertion of the indexable insert of FIG. 3 through the valve guide bore. It should be apparent that the insert is oriented such that the sides are adjacent the bore walls 154 so that the insert can be inserted into the bore.

FIG. 4B is a schematic view of the insert in the valve seat, oriented perpendicular to the longitudinal axis of the valve guide bore. The insert is oriented such that a lapping surface is in facing contact with the valve seat.

FIG. 4C is a sectional view of the module showing the insertion of the hex keyed spindle through the valve guide bore and into the aperture of the insert. An O-ring 156 may be inserted into the spindle before insertion into the valve guide bore intermediate the insert to permit the insert to free float and follow the existing seat geometry during lapping.

Lapping is preferably achieved by driving the spindle at sufficient force, (e.g., 15 lbs) to lay the seat valve surface and remove any cavitation. The spindle is then removed, the insert is removed by shaking the module or by forced air and the module is ready for further processing to refurbish the fuel injector.

While the invention has been this described, it is understood that the words used herein are words of description, not words of limitation. Many variations and modifications are possible without operating from the scope and spirit of the invention as set forth in the appended claims.

What is claimed as new and desired to be protected by Letters Patent of the United States is:

1. A method for refurbishing a valve seat in a fuel injector module housing with a valve seat of larger diameter than an associated valve guide bore, comprising:

inserting an indexable lapping insert into said valve guide bore, said insert having inclined top and bottom surfaces coated with an abrasive to form lapping surfaces; said top and bottom separated by a side wall extending substantially unbroken therebetween; said side wall comprised of two opposed flats of equal length intersecting two opposed arcs of equal length, wherein the inserting comprises orienting the lapping insert into the valve guide bore by rotational movement of said insert by a spindle; said insert having an opening extending perpendicular through said body adapted for mating engagement with the spindle;

driving the spindle to cause the insert to lap the valve seat; and removing the insert from valve guide bore when lapping of the valve seat is complete.

2. The method of claim 1, wherein said lapping surfaces are coated with a diamond or boron nitride grit.

3. The method of claim 1, herein said insert opening has a hex key configuration to be matingly engaged with a hex hey configuration spindle with a complementary hex to matingly engage said hex key opening.

4. The method of claim 1, further including an O-ring on said spindle to limit longitudinal movement of said insert on said spindle and permit insert to fill float to follow existing valve seat geometry.

* * * * *